Patented Jan. 21, 1947

2,414,504

UNITED STATES PATENT OFFICE 2,414,504

GLASS HAVING LOW-POWER FACTOR

William H. Armistead, Corning, N. Y., assignor to Corning Glass Works, Corning, N. Y., a corporation of New York No Drawing. Application January 23, 1945, Serial No. 574,203

6 Claims. (Cl. 106—52)

This invention relates to glass compositions and has for its primary object to provide new and useful glasses having certain special characteristics making them suitable as an insulating medium for conductors carrying radio frequency currents. As examples of such uses my new glasses are particularly suitable for the insulating laminae in electrical condensers and for sealing iron conductors into tubes and envelopes of electronic devices. Mica, which has heretofore been used for insulating such condensers, is very expensive and requires considerable selection to insure suitable uniformity in quality. Glass, on the other hand, can be manufactured relatively cheaply and with great uniformity in composition and properties. However, no glass heretofore has been devised which combines the desired characteristics to the extent that does the glass to be hereinafter described.

The desired characteristics are:

A power factor less than .06%, as measured at a frequency of one megacycle at room temperature. The power factor of dielectrics employed in high frequency circuits is very important and with radio frequencies the power loss is objectionably large unless the power factor is as low as .06% or less.

A dielectric constant of at least 7 or 8.

A temperature coefficient for dielectric constant less than 200 parts per million per degree C., is required to meet the Army-Navy specifications for fixed, mica-dielectric capacitors having extremely low power factors and adapted for use with relatively large currents. For other purposes, the temperature coefficient may be higher. By temperature coefficient is meant the rate of change of dielectric constant with change of temperature.

A softening temperature not greater than 625° in order to permit fusing and sealing the contiguous edges of superposed laminae of the glass without fusing intermediate metallic laminae. Softening temperature is defined in an article entitled "A method for measuring the softening temperature of glasses," by J. T. Littleton, Jour. Am. Ser. Soc., vol. 10, page 259 (1927).

A linear coefficient of thermal expansion in the neighborhood of $128 \times 10^{-7}$ centimeters per centimeter per degree C. is desirable for some purposes, such as glass-to-metal seals with iron. Lower expansion coefficients are desirable for other purposes.

Any and all of these properties may easily be obtained at the sacrifice of others and many glasses are known which have low power factors but they lack one or more of the above mentioned properties and hence have not been entirely suitable for the purposes in view. The problem solved by me has been to obtain all of the desired properties in one glass.

It is commonly believed that alkali metal oxides in glass are generally detrimental to the electrical properties of the glass, such as power factor, and that they should be omitted or kept to a minimum if low power factors and other valuable electrical characteristics are to be obtained. It is also known that glasses having very high silica contents, in the neighborhood of 100% $SiO_2$, have exceptionally low power factors. Moreover, my prior researches have shown that the unusually low power factor of some alkali-free glasses can still further be lowered by the introduction of alumina. In other words, past experience indicates that high silica, low alkali and high alumina contents are conducive to low power factors. However, they also result in high softening temperatures.

In my pending application Serial No. 558,278, filed October 11, 1944, it is shown that these generalizations do not hold true for glasses containing lead oxide and the alkali metal oxides, but that the presence of alumina and a high silica content are detrimental to the power factor of such glasses. Hence it is shown that such glasses possess all of the above mentioned desirable properties, provided that silica does not exceed 50%, alumina is absent and soda, potash and lithia are present in the proper ratios.

I have now found that the above properties are also possessed by glasses which consist essentially of silica and the oxides of barium, potassium, sodium and lithium, the $SiO_2$ being from 40% to 65%, BaO being from 10% to 50%, the total alkali metal oxides ($R_2O$) being more than 10% and not less than (10+X) where X is the excess of silica over 50%, the ratio $K_2O/Na_2O$ being from 1.5/1 to 4/1, the ratio $$(K_2O + Na_2O)/Li_2O$$

being from 4/1 to 19/1, the glass being substantially free from $Al_2O_3$. The lowest power factors are obtained when the ratio $K_2O/Na_2O$ is about 2.3/1 and the ratio $(K_2O + Na_2O)/Li_2O$ is about 9/1. There is no definite upper limit for the total content of alkali metal oxides, but on account of the approach of instability and for other practical reasons I prefer to use not more than a total of about 25% thereof. With a total alkali metal oxide content around 17% to 21% glasses having high expansion coefficients and low power factors can be produced which are particularly suitable for forming glass-to-metal seals with iron. The presence of small amounts of boric oxide does no harm but has no advantage except when it is desired to lower the expansion coefficient. If desired, the power factor and softening temperature can be lowered somewhat further by the introduction of fluorine, preferably as an alkali fluoride.

As pointed out above, the total alkali content must be not less than (10+X) where X is the excess of silica over 50%. To illustrate the critical effect which alkali metal oxides and also alumina have on the power factors of my new glasses, the following comparative compositions in percent by weight and their respective power factors are shown in Table I below. Glass A is a barium-lead glass in which $R_2O$ is less than (10+X) and which contains alumina. Except that the lead has been replaced by barium, glass B is otherwise the same as glass A. This change increased its power factor by an amount equal to 5% of its original value. In glass C the $SiO_2$ and $R_2O$ were altered sufficiently to make $R_2O$ slightly more than (10+X). The result of this was to lower the power factor to .063%, which is a change of 21% from that of glass B. In glass D the omission of alumina brought about a further lowering of the power factor by another 5%, making the glass suitable for my purpose.

Table I

|  | A | B | C | D |
|---|---|---|---|---|
| $SiO_2$ | 58.2 | 58.2 | 54.2 | 55.2 |
| PbO | 20.5 | | | |
| BaO | 7.5 | 28.0 | 28.0 | 28.0 |
| $K_2O$ | 8.8 | 8.8 | 10.5 | 10.5 |
| $Na_2O$ | 3.0 | 3.0 | 4.6 | 4.6 |
| $Li_2O$ | 1.0 | 1.0 | 1.7 | 1.7 |
| $Al_2O_3$ | 1.0 | 1.0 | 1.0 | |
| Power factor, per cent | .076 | .080 | .063 | .059 |
| (10+X) | 18.2 | 18.2 | 14.2 | 15.2 |
| $R_2O$ | 12.8 | 12.8 | 16.8 | 16.8 |

In Table II examples of glasses falling within my invention and calculated in percent by weight from their respective batches, together with their properties, are given:

Table II

|  | 1 | 2 | 3 | 4 | 5 | 6 | 7 | 8 |
|---|---|---|---|---|---|---|---|---|
| $SiO_2$ | 50 | 50 | 60.0 | 40.0 | 50.0 | 47.0 | 47.0 | 47.0 |
| BaO | 35 | 34 | 20.0 | 40.0 | 25.0 | 35.0 | 35.0 | 35.0 |
| $K_2O$ | 10 | 10 | 12.6 | 12.6 | 15.7 | 12.0 | 11.3 | 10.1 |
| $Na_2O$ | 4 | 4 | 5.4 | 5.4 | 6.8 | 5.1 | 4.9 | 4.3 |
| $Li_2O$ | 1 | 1 | 2.0 | 2.0 | 2.5 | .9 | 1.8 | 3.6 |
| $Na_2SiF_6$ |  | 1 |  |  |  |  |  |  |
| Power factor, per cent | .052 | .050 | .058 | .041 | .045 | .045 | .043 | .046 |
| Dielectric constant | 8.0 | 8.0 | 7.7 | 8.4 | 8.4 | 8.1 | 8.1 | 8.1 |
| Temperature coefficient, P. P. M. per °C | 132 | 132 |  |  |  |  |  |  |
| Softening temp., °C | 618 | 607 | 590 | 543 | 534 | 588 | 577 | 557 |
| Expansion coeff. ×$10^7$ | 117 | 117 | 119 | 137 | 136 | 128 | 128 | 128 |

About 1% of $Sb_2O_3$ was introduced into the batches for the purpose of fining the glasses. This has no substantial effect on their properties. The values for power factor were measured at a frequency of one megacycle by the method known as A. S. T. M. D-150-42T, set forth on page 1148 et seq., part III of the A. S. T. M. Standards for 1942.

It will be noted that the power factors of the above glasses are substantially below .06% and that their other properties are also suitable for the purposes set forth above. Glass 2 illustrates the effect of adding fluorine to glass 1 and the power factor and the softening point were thereby lowered. Glasses 1 and 2 are particularly suitable for insulating laminae in lieu of mica in large-current, fixed condensers or capacitors. Glasses 6, 7, and 8, which have expansion coefficients near that of iron, are particularly useful as iron-sealing glasses in the manufacture of glass-to-metal seals.

I claim:

1. A glass having a power factor less than .06%, a dielectric constant of at least 7 and a softening temperature less than 625° C., which consists essentially of $SiO_2$, BaO, $K_2O$, $Na_2O$ and $Li_2O$, the $SiO_2$ being from 40% to 65%, BaO being from 10% to 50%, the total alkali metal oxides being more than 10% and not less than (10+X) where X is the excess of $SiO_2$ over 50%, the ratio $K_2O/Na_2O$ being from 1.5/1 to 4/1, the ratio $(K_2O+Na_2O)/Li_2O$ being from 4/1 to 19/1, the glass being substantially free from $Al_2O_3$.

2. A glass having a power factor less than .06%, a dielectric constant of at least 7 and a softening temperature less than 625° C., which consists essentially of $SiO_2$, BaO, $K_2O$, $Na_2O$ and $Li_2O$, the $SiO_2$ being from 40% to 65%, BaO being from 10% to 50%, the total alkali metal oxides being more than 10% and not less than (10+X) where X is the excess of $SiO_2$ over 50%, the ratio $K_2O/Na_2O$ being about 2.3/1; the ratio $(K_2O+Na_2O)/Li_2O$ being about 9/1, the glass being substantially free from $Al_2O_3$.

3. A glass having a power factor less than .06%, a dielectric constant of at least 7 and a softening temperature less than 625° C., which consists essentially of $SiO_2$, BaO, $K_2O$, $Na_2O$, and $Li_2O$, the $SiO_2$ being from 40% to 65%, BaO being from 10% to 50%, the total alkali metal oxides being more than 10% and not less than (10+X) where X is the excess of $SiO_2$ over 50%, the ratio $K_2O/Na_2O$ being from 1.5/1 to 4/1, the ratio $(K_2O+Na_2O)/Li_2O$ being from 4/1 to 19/1, the glass being substantially free from $Al_2O_3$, and containing fluorine.

4. A glass having a power factor less than .06% and an expansion coefficient about $128 \times 10^{-7}$ cm. per cm. per degree C., which consists essentially of $SiO_2$, BaO, $K_2O$, $Na_2O$, and $Li_2O$, the $SiO_2$ being from 40% to 65%, BaO from 10% to 50%, total alkali metal oxides from about 17% to about 21%, the ratio $K_2O/Na_2O$ being from 1.5/1 to 4/1, the ratio $(K_2O+Na_2O)/Li_2O$ being from 4/1 to 19/1, the glass being substantially free from $Al_2O_3$.

5. A glass having a power factor less than .06%, a dielectric constant of at least 7 and a softening temperature less than 625° C., which has the approximate composition 47% $SiO_2$, 35% BaO, 10% to 12% $K_2O$, 4% to 5.5% $Na_2O$, and .9% to 3.6% $Li_2O$.

6. A glass having a power factor less than .06%, a dielectric constant of at least 7 and a softening temperature less than 625° C., which has the approximate composition 47% $SiO_2$, 35% BaO, 11.3% $K_2O$, 4.9% $Na_2O$, and 1.8% $Li_2O$.

WILLIAM H. ARMISTEAD.